United States Patent [19]

Broekhoven et al.

[11] Patent Number: 4,894,842
[45] Date of Patent: Jan. 16, 1990

[54] PRECORRELATION DIGITAL SPREAD SPECTRUM RECEIVER

[75] Inventors: Paul V. Broekhoven, Needham; Daniel Fitzmartin, Newton; Paul Blasche, Arlington; Duncan B. Cox, Jr., Manchester; Triveni Upadhyay, Burlington, all of Mass.

[73] Assignee: The Charles Stark Draper Laboratory, Inc., Boston, Mass.

[21] Appl. No.: 108,922

[22] Filed: Oct. 15, 1987

[51] Int. Cl.[4] .............................................. H04K 1/02
[52] U.S. Cl. ......................................................... 375/1
[58] Field of Search .............................. 375/1; 380/34; 364/715.11

[56] References Cited

U.S. PATENT DOCUMENTS

| | | | |
|---|---|---|---|
| 4,168,529 | 9/1979 | Tomlinson | 364/715.11 |
| 4,528,674 | 7/1985 | Sweeney et al. | 375/1 |
| 4,530,103 | 7/1985 | Mosley, Jr. et al. | 375/1 |
| 4,649,549 | 3/1987 | Halpern et al. | 375/1 |
| 4,701,934 | 10/1987 | Jasper | 375/1 |
| 4,785,463 | 11/1988 | Janc et al. | 375/1 |

Primary Examiner—Salvatore Cangialosi
Attorney, Agent, or Firm—Lahive & Cockfield

[57] ABSTRACT

A precorrelation digital spread spectrum receiver includes a signal converter for amplifying and directly converting RF band spread spectrum signals received by an antenna to a digitized baseband signal comprising a sequence of N-bit quantized baseband values. The baseband signal is a linear composite signal containing signals from all satellite channels as well as noise and jamming. An N-bit digital correlator correlates successive N-bit baseband signal values with successive local code values to produce plural correlation signals. A vector processor processes the correlation signals to derive early, late and on-time code correlation signals. The processed correlation signals are accumulated to provide process gain and are used to form error signals for carrier and code tracking, and measurement purposes.

A sequential-tracking multi-channel embodiment time shares a common set of circuit elements and digital processing instructions to successively track different channels.

In a preferred embodiment, the vector processor uses micro-code instructions to remove the carrier Dopler shift by multiplying the correlation value with a stored complex constant corresponding to the Doppler contribution. The receiver provides coarsely quantized code delays to the correlator, and uses digital interpolation routines to estimate correlation values for code delays of interest, thus providing fine resolution in the code delay without using either a numerical control oscillator or crystal oven.

7 Claims, 5 Drawing Sheets

PRECORRELATION DIGITAL SPREAD SPECTRUM RECEIVER

BACKGROUND

The present invention relates to radio receiving apparatus of the type for receiving and processing spread spectrum radio signals. Such radio signals are commonly used in satellite communication systems, and particularly in navigation systems such as the GPS system, and in other communications systems requiring a high level of immunity to Gaussian noise and jamming, such as low probability of intercept communications systems.

The GPS system is a satellite based global passive radio navigation system which enables a properly equipped user to calculate his position to an accuracy of a few meters and his velocity to a few tenths of meters per second in three dimensions. Worldwide coverage is obtained with a network of satellites in dispersed non-geosynchronous orbits, with a minimum of four and an average of six satellites visible at all times from any point on the earth's surface. All satellites transmit signals referenced to a common system time continuously on two common frequencies around 1575 MHz ($L_1$) and 1228 MHz ($L_2$). The signals consist of ranging codes, unique to each satellite, which are modulated with a data stream which gives the user an accurate position of the transmitting satellite, an almanac for the whole system to enable him to choose the best satellites, and various corrections and status information. Each transmitted signal is spread over a wide band by modulation with a binary pseudo-noise (PN) (or pseudo-random) code sequence generated at a code chip frequency substantially greater than the data rate. The signal bandwidth is about 20 MHz at each frequency, and the transmitted polarization is circular. Position is found by measuring the pseudo-ranges to four satellites. These are ranges measured by estimating the propagation time using a receiving clock which is not aligned with system time. Four such measurements enable the user's position and the time offset in his clock to be calculated. Likewise, four Doppler measurements enable the velocity and clock frequency error to be found.

In prior art receivers, the received signal is demodulated by multiplying the incoming modulated signal by a coherent replica of the carrier, and low pass filtering to strip off the carrier Doppler, then multiplying by a locally generated code sequence. If the locally generated code sequence is in phase with the received code sequence, the transmitted message sequence results. Alternatively, the signal may be demodulated by multiplying by a synchronous replica of the code, then removing the carrier Doppler. In either case, the signal remaining after stripping the code or carrier is quite low, and high levels of initial amplification of the received signal from the antenna are necessary to assure that the processed signal has an acceptable level.

The received signal levels at the antenna are typically 30db below thermal noise, and the ground receiver requires narrow bandwidth tracking loops to lock onto the signal. The hardware necessary to perform the required signal discrimination and amplification is complex and costly. In general, prior art receivers include a separate channel for each satellite to be tracked. Each channel includes analog circuitry for amplification, and tracking oscillators and other analog components for in-phase and quadrature determination, which introduce considerable noise into the system, and further introduce errors, due, for example, to variations or mismatching of components and processing in the different channels.

OBJECT AND SUMMARY OF THE INVENTION

It is an object of the invention to provide a simplified construction for a spread spectrum receiver.

It is another object of the invention to provide a spread spectrum receiver having a common RF signal converter stage for all channels.

It is another object of the invention to provide a baseband sampling direct sequence receiver which digitizes the received signal prior to performing any channel separation or any code or carrier correlation or tracking.

It is another object of the invention to provide an improved spread spectrum receiver for receiving plural spread spectrum RF signal channels, wherein the receiver has a common analog RF conversion stage for processing a composite of plural spread spectrum RF signals.

It is another object of the invention to provide an improved spread spectrum receiver employing Doppler independent local oscillator signals to demodulate plural distinct RF channels, each channel being modulated in accordance with a different code and having a different Doppler shift.

These and other features of the invention are achieved in a receiver having a signal converter for amplifying and directly converting spread spectrum signals received by an antenna to a digitized baseband signal comprising a sequence of complex N-bit quantized baseband values. The baseband signal is a linear composite signal containing signals from all satellite channels as well as noise and jamming. A code generator generates a plurality of local code signals, each of a plurality of locally generated code signals being delayed by a multiple of $\Delta T$. An N-bit digital correlator correlates the N-bit baseband values with the successive code values to produce plural correlation signals. A vector processor processes the correlation signals to derive early, late and on-time code correlation signals, and strips their carrier Doppler shifts. The processed correlation signals are accumulated to provide process gain and are used to form error signals for tracking and measurement purposes.

The invention reduces the processing of several code-division multiple-access (CDMA) spread-spectrum signals, conventionally performed with dedicated circuits for each channel, to a common digital operation, effectively time-sharing a single set of circuitry. In a preferred embodiment, the vector processor uses microcode instructions to remove the carrier Doppler shift by multiplying the correlation value with a stored complex constant corresponding to the Doppler contribution. The receiver provides coarsely quantized code delays to the correlator, and uses digital interpolation routines to estimate correlation values for code delays of interest, thus providing fine resolution in the code delay without using individual numerical control oscillator code clocks for each satellite signal.

BRIEF DESCRIPTION OF DRAWINGS

These and other features of the invention will be understood from the following description of illustrative embodiments, with reference to the drawings, in which.

DESCRIPTION OF PREFERRED EMBODIMENT

A pre-correlation digital spread spectrum receiver according to the present invention has a unique architecture which dispenses with analog circuitry for the code and carrier tracking. The receiver amplifies the received signal and converts it to baseband, then digitizes the signal and performs channel identification, code synchronizing and Doppler removal by computations on the digitized signals. A principal advantage of a receiver according to the invention is that less pre-correlation amplification is required, so that, in particular, the amount of amplification (number of amplifiers) required to simultaneously track four satellites is greatly reduced. Another advantage is that when used for simultaneously receiving plural spread spectrum channels spread over the same band, such as for receiving the GPS signals from multiple GPS satellites simultaneously, a common signal converter stage provides a single composite digitized baseband signal which is digitally processed to track all available satellites.

This results in reduction of the number of RF amplifiers and eliminates the separate tracking circuitry formerly used for each channel of a multi-channel receiver. To achieve code tracking and Doppler removal by digital means however, requires massive computations which, in order to satisfy Nuyquist criteria, must further be carried out on a converted signal which is sampled at a high frequency, significantly greater than the clock frequency of commonly available microcomputers. Accordingly, a preferred embodiment of the invention uses digital signal processing microchip components to perform the correlation operations necessary for signal measurement and the numerical computations for code tracking and Doppler removal, with process gain achieved by a simple accumulation in each stage.

Figure 1:
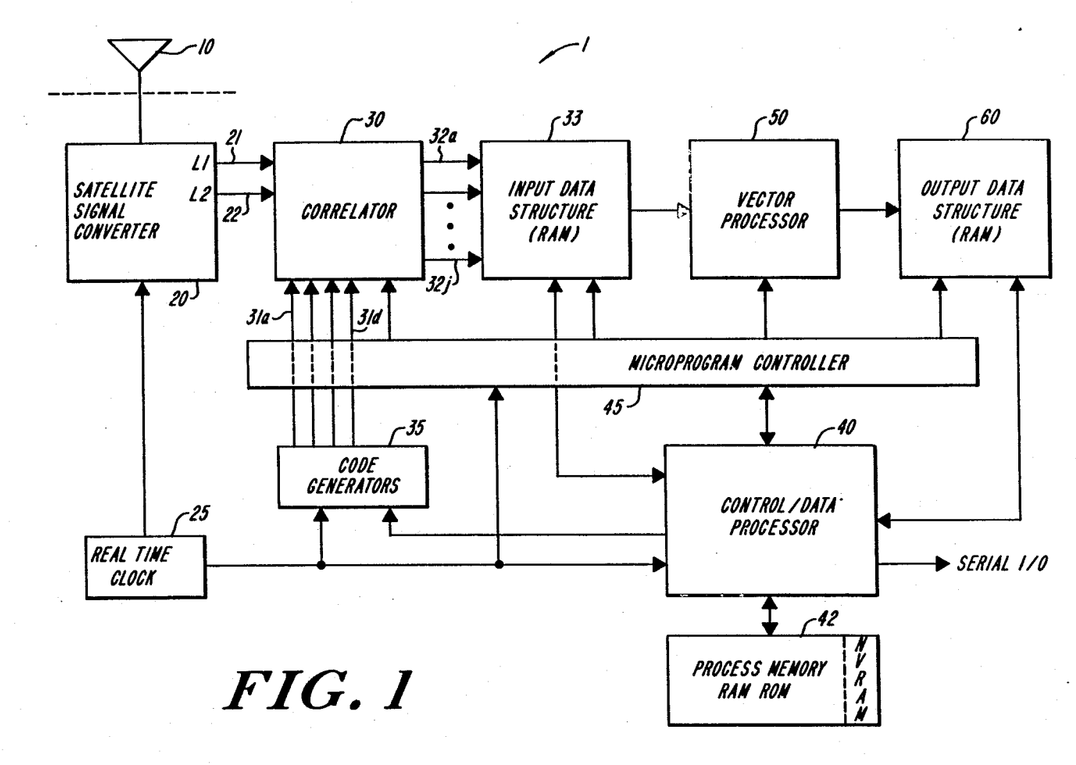
FIG. 1 is a block diagram of a pre-correlation digital spread spectrum receiver according to one preferred practice of the invention.

FIG. 1 is a schematic block diagram of a preferred embodiment of a receiver 1 according to the invention for receiving GPS spread spectrum signals. An antenna 10, which is preferably a broad band or doubly tuned antenna having $L_1$ and $L_2$ gain characteristics, feeds into a satellite signal converter 20 which filters, amplifies and shifts the $L_1$ and $L_2$ signals from the antenna to a baseband signal. The baseband signal is sampled and digitized, and the digitized outputs 21, 22 are provided as inputs to a digital correlator 30.

Correlator 30 correlates the digitized satellite signals 21, 22 with a plurality of successive local codes provided over code lines 31a, ... 31d from a code generator 35, and delivers correlation outputs along lines 32a, ... 32j to an input data RAM 33. RAM 33 is a multi-port memory device which serves as an input data structure for partially processed signals. The contents of RAM 33 are also read/write accessible to CPU controller 40.

For each channel to be tracked, correlator 30 correlates the sampled signal with a number of incrementally delayed codes, each offset by a time interval $\Delta T$ which is less than one half chip from the next code, and accumulates the corresponding results to provide a measure of the digitized satellite signal times the local code for each code offset. A vector processor 50 receives the correlator outputs from RAM 33 and performs fast computations to track the code and determine code offset, to remove the carrier and to provide a carrier phase error signal. The results of the vector computations are written to an output data RAM 60 which is a multiport RAM accessible to CPU controller 40. A microprogram controller 45 provides program instructions and synchronizes the operation of the correlator 30, the vector processor 50, RAM 33 and RAM 60. A CPU memory 42 provides process memory for controller 40, and preferably further includes a stored navigation program for operating with GPS system data and for interfacing with a display and with a vehicular navigation system.

Figure 2:
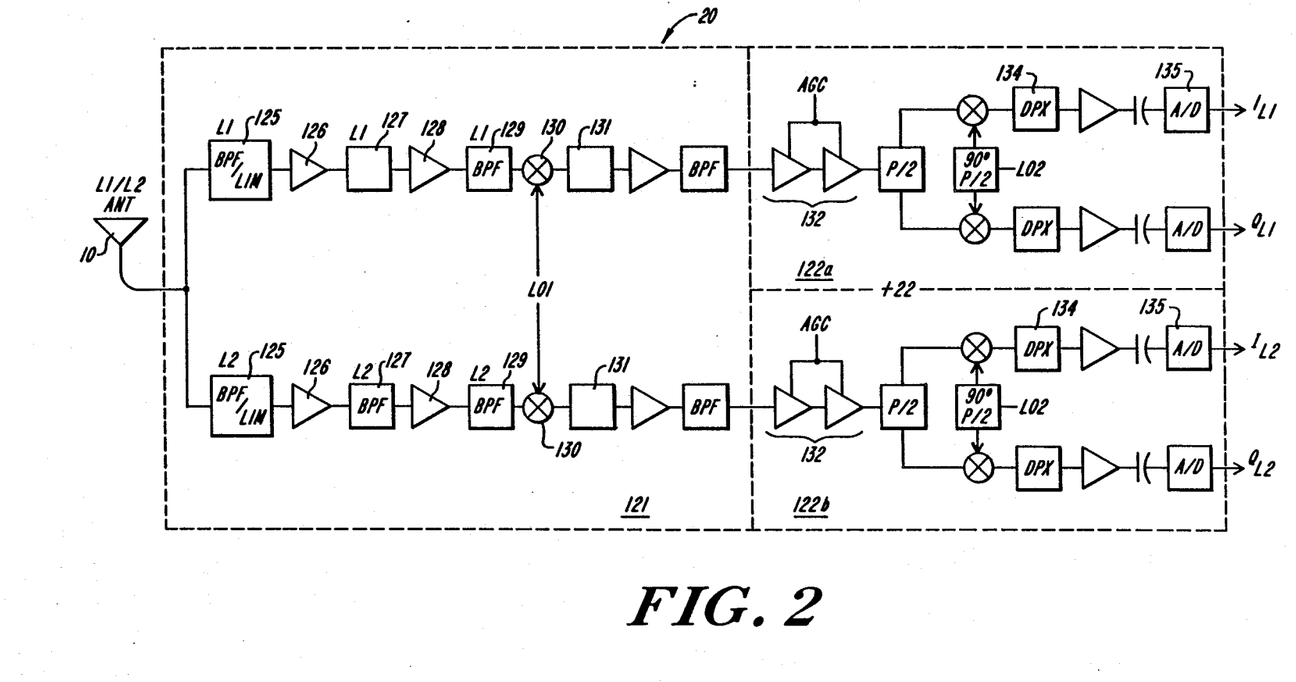
FIG. 2 is a block diagram of a satellite signal converter of a illustrative embodiment.

FIG. 2 shows a detailed block diagram of a suitable satellite signal converter 20 for practicing the invention, which consist of an RF preamp/downconverter section 121 and an automatic gain control/baseband conversion section 122. As illustrated, the baseband converter 122 includes two substantially similar conversion sections 122a, 122b for converting the IF signals derived from the $L_1$ and $L_2$ band signals, respectively, to baseband.

In downconverter section 121 the antenna signal is band pass filtered by filters 125, 127, 129 and amplified by low noise amplifiers 126, 128 to produce an amplified signal which is mixed with a local oscillator signal LO1 at mixer 130 to downconvert the signal to an IF signal. LO1 is selected to be 1401.5 MHz, for converting both the $L_1$ and $L_2$ satellite signals to a common IF signal at 173.91 MHz. The IF signal is low pass filtered by filter 131 and amplified before passing to the AGC/baseband conversion stage 122.

In stage 122 an AGC amplifier 132 provides a controlled gain to normalize the IF signal level. The output of the amplifier feeds the baseband converter in which the IF signals are converted to baseband signals by quadrature phase detectors with a second local oscillator signal LO2 at 173.91 MHz. The phase detectors are terminated in a diplexer 134 which provides additional signal filtering as well as proper termination for the image signal at 347.82 MHz. The orthogonal in-phase (I) and quadrature (Q) baseband signals are then amplified, and are digitized in N-bit analog to digital converters 135. The AGC amplifier keeps the signal provided to the A/D converter at the proper level for optimal signal recovery. The digitized output then passes to correlator 30 (FIG. 1).

It will be appreciated that although FIG. 2 shows separate processing circuits for $L_1$ and $L_2$ signal conversion, sharing only the local oscillators LO1 and LO2 in common, such separate dedicated circuitry is not necessary. After the initial filtering and amplification 125, 126, 127 a common switched amplifier and switched filter in a common circuit may be used in place of separate signal path elements 128, 129 for leading the $L_1$ and $L_2$ signals to the IF conversion mixer 130. In such an alternative embodiment, a single processing circuit is alternatively switched between the $L_1$ and $L_2$ filters to downconvert both the $L_1$ and $L_2$ signals. The switched amplifier may be a low-noise GaAs amplifier, with FET switches, and the filters 129 of the two bands may be replaced by a single resonator image-noise rejection bandpass filter which is switched in center frequency using a varactor diode. For this sequentially operating $L_1/L_2$ converter, a single IF/baseband conversion path, corresponding to one-half of section 122, is used. Such a sequentially-operating $L_1/L_2$ downconverter is a preferred embodiment for those applications in which power consumption and circuit weight are critical and where sequential tracking is consistent with the dynamics of the intended receiver use.

The signal converter 122 provides quantized orthogonal N-bit I and Q baseband signals at a 25 MHz sampling frequency to the correlator 30 of FIG. 1.

Figure 3:
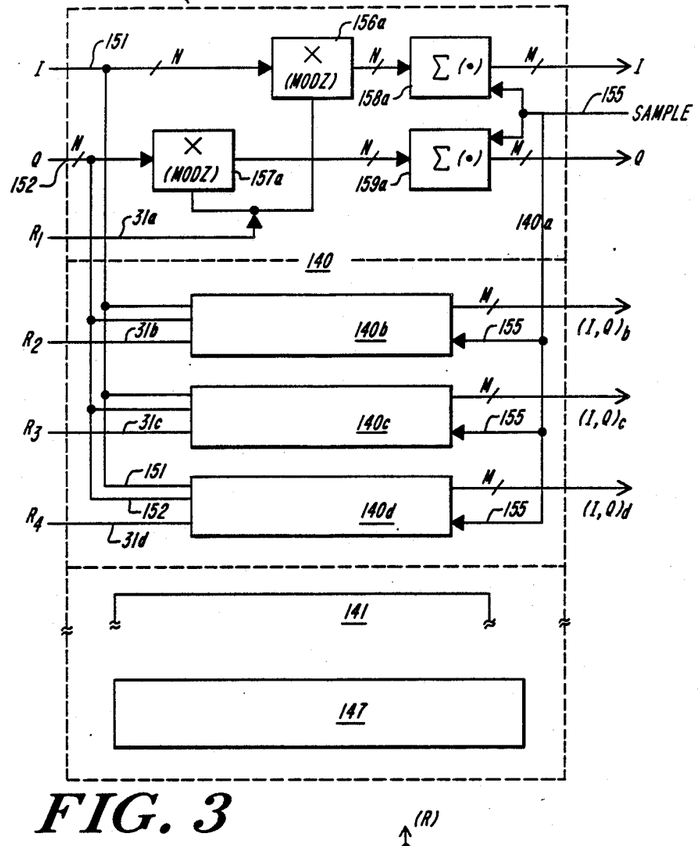
FIG. 3 is a schematic diagram of operation of the correlator of the receiver according to FIG. 1.

FIG. 3 shows an organizational diagram of one processing channel of the correlator 30, which is preferably implemented on VLSI chip. Correlator 30 receives N-bit digitized I and Q signals over line 21 or 22 (FIG. 1) and sends these signals as identical input pairs on lines 151, 152 to four computation cells 140a–140d. In cell 140a, one locally generated pseudo-noise code signal $R_1$ is provided as a reference signal from the code generator 35 of FIG. 1, along line 31a, and corresponding successively offset code signals $R_2$, $R_3$, $R_4$ are provided along lines 31b, 31c, 31d, respectively, to identical correlation cells 140b, 140c and 140d, respectively. In one preferred embodiment each of the code signals $R_1$, $R_2$, $R_3$, $R_4$ is the code corresponding to a time interval successively offset by the sampling interval $\Delta T$ at each successive cell 140a, 140b, 140c, 140d. Illustratively, the I, Q digitized received signals on lines 151, 152 and the reference codes are clocked in at a 25 MHz sampling frequency, so that $\Delta T$ is approximately four-tenths of a code chip for the GPS P code. Applicants have found that by setting the sampling frequency $f_s$ relative to the code chipping frequency $f_c$ such that the two are "irrational" multiples of each other, rather than using simple Nuyquist sampling at a sampling frequency $2f_c$, superior code phase resolution is achieved. By "irrational" is meant, here, that the two frequencies are not low-integer fractional multiples of each other. This reduces the "beat" of the two frequencies, so that effectively the phase of the sampling points will "slide" along the code chip phase without having fixed sampling points in a signal accumulation interval. This sampling assures adequate code phase resolution and permits implementation of a variety of code tracking techniques by varying a code estimation algorithm while using substantially identical circuit components.

As shown in detail for cell 140a, within a cell, the N-bit I, Q signals are each multiplied by the corresponding 1-bit PN reference code in multipliers 156a, 157a and the products accumulated in respective M-bit accumulators 158a, 159a to provide process gain. After fewer than $2^{M-N}$ sampling intervals, a strobe signal on line 155 causes the accumulators to empty, providing an M-bit I, Q output signal equal to the accumulation of the sampled N-bit input signals representing the received satellite signal including noise and jammer contributions. Thus, each correlator cell is made up of a complex multiplier and accumulator, and is used to correlate the received signal with a local code of interest. The local code is represented as $(+1+jO)$ or $(-1-jO)$, while the input signal+noise+jammer sample is $(I+jQ)$. The product of these two is either $(I+jQ)$ or $(-I-jQ)$ depending on the local code value, and the real $(\pm I)$ and imaginary $(\pm Q)$ parts of this product are accumulated separately to yield the complex output.

In one prototype design, the I, Q signals from down converter 20 are 6-bit digital samples and the accumulators 158a, 159a are 14-bit fixed point accumulators which may accumulate 256 (i.e., $2^{(14-6)}$) code-correlated signals, providing over 20db of gain. Each cell provides the accumulated correlation output (I, Q) signal for one local code $R_1$, $R_2$, $R_3$ or $R_4$, and the magnitude of these signals is used for tracking, as described in detail below.

FIG. 3 schematically illustrates a correlator having eight four-cell channels 140, 141,...147, with the channels 141,...147 each having four cells, in a manner identical to channel 140. It will be appreciated that this structure permits simultaneous tracking of up to eight satellite signals by providing four local reference codes each related to a single local PN code, corresponding to a separate satellite, to each channel. The local reference codes may be, for instance four code values offset by a sampling interval $\Delta T$, described herein, or may be Early, Late, On-Time or Early-minus-Late codes. Three such codes, rather than four, may be used, in which case a three-cell channel is employed, and a basic receiver may have five continuously-tracking channels, rather than the illustrated eight. Another, alternative embodiment, where fast signal acquisition in conditions of noise or high dynamics is required, employs a large number of cells for each channel. In such embodiment, for example, a 32 word shift register may be used to successively provide the PN local code for a single channel to each of 32 correlation cells. In a code acquisition node, the magnitude of each cell output is inspected to identify the code chip with the highest correlation. This decreases code search time and speeds up acquisition of code lock by scanning a larger number of codes at once. Correspondingly, for low dynamic uses, a single channel four-cell correlator may be sequentially provided with codes for different channels to successively develop the code correlation signals for different satellites.

Figure 4:
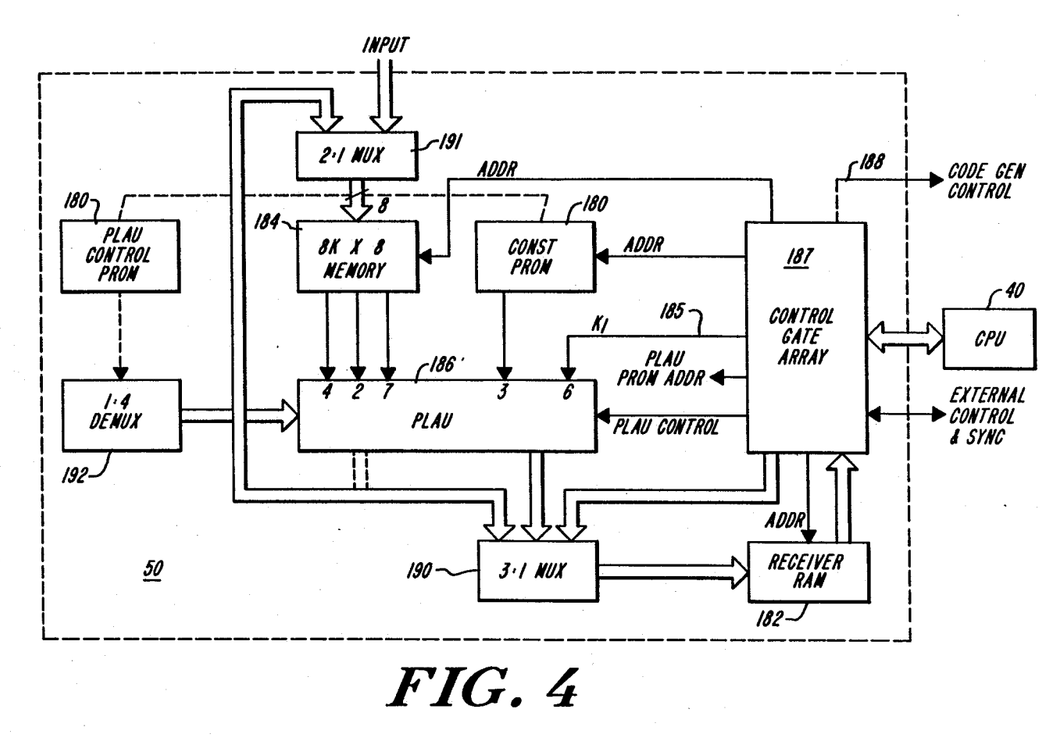
FIG. 4 is a block diagram of the vector processor section of the receiver of FIG. 1.

FIG. 4 shows a block diagram of vector processor (50 of FIG. 1) which performs the tracking and Doppler stripping operations briefly described above. The correlator 30 provides, for each satellite channel, four correlation outputs indicative of the baseband signal correlation at four equi-spaced sampling points, denoted 0, $\Delta T$, $2\Delta T$, $3\Delta T$. The interval $\Delta T$ is 0.04 microseconds for the 25 MHz processor clock interval, so the four correlation values correspond to four code offsets within a 0.12 microsecond interval, i.e. within approximately a one-chip interval. Thus, two correlator outputs will be "early" corresponding to code offsets prior to the precise code synchronization, and two correlator outputs will be "late". In this prototype design, the vector processor first linearly interpolates between the two early of on-time correlator outputs and the two late of on-time correlator outputs to estimate a signal correlation value for each of ¼ chip early and ¼ chip late codes.

Figure 5:
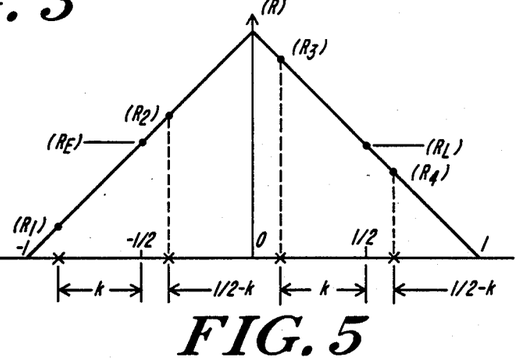
FIG. 5 is a graph illustrating code phase interpolation according to the preferred embodiment of the invention.

FIG. 5 shows a graph of the linear interpolation performed by this stage of the vector processor. In the figure, $R_1$ and $R_2$ indicate the two correlator outputs in the early phase, and $R_3$, $R_4$ the outputs in the late phase. Based on the last accumulated vector processor outputs, the data processor 40 estimates the phase delay error of the receiver's fixed frequency code replica clock with respect to the ¼ chip early and ¼ chip late of on-time points, and determines a scalar K representing this offset. The vector processor then computes a ¼ chip early correlation value $R_E = kR_1 + (1-k)R_2$ and a corresponding ½ chip late correlation value $R_L = kR_3 + (1-k)R_4$. Further process gain is required against these $R_E$ and $R_L$ correlation values to achieve a meaningful signal to noise ratio, but the presence of the carrier Doppler/local oscillator term on the estimated correlation values limits the efficiency of the gain which may be achieved by accumulating the correlation values. Accordingly, referring again to FIG. 4, in a next processing stage the vector processor removes the Doppler/L0 term from the computed $R_E$ and $R_L$ values by an arithmetic computation of multiplying the computed early (respectively, late) correlation value by a complex Doppler correction number $e^{j(\hat{\psi}_D + \hat{\psi}_{L0})t + \hat{\phi}}$ where $\hat{\psi}_D$ is the estimated carrier Doppler, $\hat{\psi}_{L0}$ is the estimated local oscillator offset, and $\hat{\phi}$ is the carrier phase estimate. These estimated values are provided from the data processor 40 (FIG. 1), and the complex numbers $e^{j(\hat{\psi}_D + \hat{\psi}_{L0})t + \hat{\phi}}$ provided from a sin/cos table of constants in a ROM 180.

In one such embodiment perating with a 25 MHz vector clock rate, the vector processor illustratively proceeds as follows. The first forty clocks load 20 complex words of data (five sets of four complex I/Q correlation values from the correlator 30) to the input buffer memory 184. The next sixty-four clocks compute the $R_E$, $R_L$ linear interpolation by multiplying successive I/Q pairs by k, and $(1-k)$ as shown in FIG. 5, and placing the results back in the input buffer 184 via 2:1 MUX 191. The next sixty-four Clocks clock the multiplication by the Doppler correction constants $e^{j(\hat{\psi}_D + \hat{\psi}_{L0})t + \hat{\phi}}$, and return the Doppler corrected values to memory 184. The corrected signals are then summed and output to system memory 182 which is accessible to CPU controller 40. Such illustrative processing requires approximately 225 clocks, or nine microseconds to process the code tracking and Doppler correction signals.

Referring still to FIG. 4, the input memory 184 is an 8k × 8 RAM used to provide the correlator output signals to pipelined arithmetic unit (PLAU) 186 which also receives inputs from a constant PROM 180 and from the k-function generator along line 185. PROM 180 includes the PLAU arithmetic instructions, which are down loaded to the PLAU on startup, and also holds the table of complex constants for forming the quantities $e^{j(\hat{\psi}_D + \hat{\psi}_{L0})t + \hat{\phi}}$ used for Doppler removal. A control gate array 187 provides addresses to PROM 180 causing it to deliver the appropriate $e^{j(\hat{\psi}_D + \hat{\psi}_{L0})t + \hat{\phi}}$ constants to the PLAU, based on phase and frequency offset information provided by a phase and frequency determination algorithm in the CPU. Multiplexers 190, 191 and a demultiplexer 192 maintain the data loading, data processing and instruction flow in synchrony.

Preferably, the successive values of the corrected ¼ chip early and ½ chip late correlation values $R_E$, $R_L$ are accumulated over a selectively variable time interval, which is varied between 1-20 milliseconds, with the accumulation interval set by the data processor, CPU controller 40 to effect optimal process gain based on detected signal strength and on receiver dynamics. The receiver updates the code offset and carrier phase corrections k, $\hat{\psi}_D$ and $\hat{\psi}_{L0}$ after the 1-20 ms accumulation interval, with these quantities propogated over that interval for the code delay and carrier phase corrections.

In addition to the corrected $R_E$ and $R_L$ corresponding to ¼ chip early and ½ chip late interpolated signal correlation values, the vector processor also accumulates the corrected sum of ($R_i$ * (Doppler correction number)) over the 1-20 ms accumulation interval where, for each sample, $R_i$ is selected from the four correlator outputs of a given channel as $$R_i = \begin{cases} R_2 \text{ for } 0 < k < 1/4 \\ R_3 \text{ for } 1/4 < k < 1/2. \end{cases}$$

That is, vector processor 50 selects the correlation value $R_2$ or $R_3$ which in a given interval is closest to on-time. This accumulation provides an estimated on-time correlation signal $R_{OT}$ which has a greater signal strength than the code tracking signals $R_E$, $R_L$, and which is provided to CPU 40 for carrier tracking.

Vector processor 50 also forms a code offset error signal by forming an estimate of the signal power. To develop the signal power estimate, the I and Q components of the interpolated early and late correlation values are fed to an envelope detector algorithm, and the processor subtracts the ½ chip late envelope from the ¼ chip early envelope to obtain a power signal. The power signal is accumulated in an accumulator in control gate array 187. In the operation of a preferred embodiment, the code clock quiescent frequency is set higher than the maximum expected code Doppler, so that the phase of the code generator will always advance with respect to the received signal. As the code offset increases, the power signal increases, so the accumulator overflows, causing a phase error signal to be sent on line 188 to the code generator 35 (FIG. 1) to bump the code phase back one-half chip. This maintains the local code replica on line 31 (FIG. 1) within one-half chip of the received code.

Similarly, the carrier frequency error is computed as $(Q_0(i)*I_0(i-1) - Q_0(i-1)*I_0(i))/\Delta T$ where i, i − 1 represent the current and previous accumulation values, $\Delta T$ is the interval between samples, and $I_0$, $Q_0$ are the in phase and quadrature components of the accumulated on time correlation signal $R_{OT}$.

In this manner the digitized received signal is separated into channels and the code and carrier are tracked entirely by digital means, using a common Doppler independent oscillator to provide processing signals for all channels.

This architecture permits the construction of a receiver having extremely low power consumption.

In one preferred embodiment of a digital microreceiver, the power consumption is further reduced by a unique time synthesis circuit. In that embodiment, the real time clock (25 of FIG. 1) provides frequency standards for the system which are derived from a single crystal oscillator, and digitally compensates a local oscillator frequency derived from the crystal to compensate for temperature-induced frequency variations of the crystal. This provides the necessary degree of frequency accuracy, which was formerly achieved with precision crystals maintained in constant-temperature ovens, and avoids the high cost and high power requirements of such components.

Figure 6:
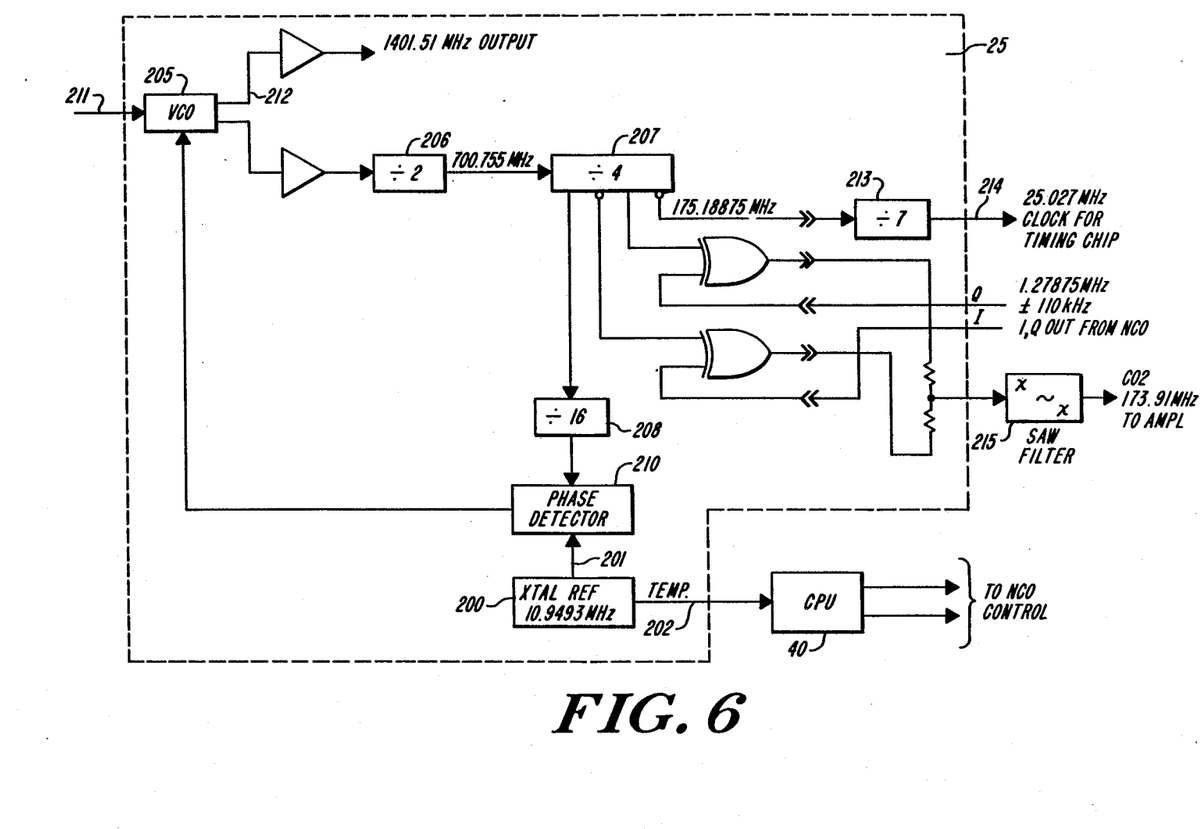
FIG. 6 is a block diagram of a frequency and timing section of a preferred embodiment.

FIG. 6 shows one embodiment of the temperature compensated frequency synthesis according to this aspect of the invention, in which a crystal oscillator section 200 provides a base frequency signal at 10.9493 MHz along output line 201, and provides a temperature indication along line 202 to CPU 40. The L01 IF frequency at 1401.51 MHz is generated by a VCO 205 which has an output locked to the crystal oscillator 200 through a fixed divide-by-128 chain of dividers 206, 207, 208 and a phase detector feedback loop 210.

The CPU stores a table of the crystal frequency variation as a function of crystal temperature, which may, for example, be made when the crystal is first calibrated. Using the stored table, CPU 40 responds to the temperature signal on line 202 to provide a corresponding L02 frequency correction output on control lines 220 which determines the control signal provided to the NCO. The NCO then produces a difference frequency which is calculated to correct for the temperature-induced frequency variation of the crystal-derived synthesized frequencies. This difference frequency is mixed with the synthesized frequency so as to produce a corrected L02 frequency at 173.91 MHz. This provides the precise L02 frequency used in the satellite signal converter 20. Preferably the dividers 206, 207, 208 are implemented in GaAs logic. The temperature signal may be provided by a temperature sensor at the crystal, or may be a temperature-dependent signal generated by the crystal itself, from which the CPU computationally derives the corresponding temperature. The latter approach eliminates temperature measurement hysteresis.

A second system frequency is formed by divider chain 206, 207, 213 which divides the VCO-corrected L01 frequency by 28, providing a 25.027 MHz clock output 214 for the vector processor and correlator timing.

The required local oscillator frequency L02 for satellite-to-baseband conversion is 173.91 MHz which is not a fractional multiple of the crystal reference frequency. The real time clock 25 synthesizes this third system frequency signal by directly mixing a crystal-derive 175.18875 MHz frequency from divide-by-8 divider chain 206,207 with a nominal 1.27875 MHz signal generated by the numerical control oscillator (NCO) to obtain the required L02 as the difference frequency. The 175 MHz frequency is locked to the crystal and thus also varies with the thermal drift of the crystal. The CPU 40 provides temperature correction signals on output lines 220 to the NCO to compensate for the ± 10 KHz thermal drift of the reference crystal oscillator so that the sum of L01 and L02 is equal to 1575.42 MHz independent of temperature. Preferably a single-sideband mixer is used to select the difference frequency and to prevent coupling of the upper sideband to the output. A saw filter 215 cleans the synthesized frequency output. In the foregoing manner the receiver uses a simple unregulated crystal oscillator to provide the necessary frequencies for RF downconversion, yet achieves extreme accuracy by digitally compensating a crystal-derived local oscillator frequency to eliminate crystal temperature-dependent shifts.

The foregoing description of the architecture of particular embodiments of a pre-correlation digital spread spectrum receiver according to the invention is intended as illustrative of and not as limiting of the scope of the invention, which in its essential form comprises a receiver having a first circuit section for downconverting to baseband and for digitizing a received spread spectrum RF signal, and a second section wherein digital processing elements track the code and carrier and extract the signals from each channel. The invention being thus disclosed, variations and modifications of a receiver according to the invention, or sections thereof, will occur to those skilled in the art, and are intended to be within the scope of the invention, as defined by the following claims:

What is claimed is:

1. A direct sequence spread spectrum RF receiver for receiving and processing an RF signal having plural modulated channel component RF signals broadcast from plural sources, each channel component RF signal being a spread spectrum signal modulated in accordance with channel code, wherein the receiver comprises
   A. means for receiving said plural component RF signals and forming from said component RF signals a linear composite RF signal,
   B. baseband converter means for converting said linear composite RF signal to a baseband signal,
   N-bit digitizing means for converting said baseband signal to a succession of N-bit digital signals at a sampling frequency, each digital signal being representative of a corresponding value of said baseband signal,
   D. code generator means for generating a plurality of offset local code signals,
   E. a correlator for correlating said N-bit digital signals with said plurality of offset local code signals and for producing plural digital signal/code correlation signals, each said signal/code correlation signal being representative of the correlation of said N-bit digital signal with a local code signal having a different offset, and
   F. tracking means responsive to said correlation signals for tracking the code state and carrier of a component of said baseband signal derived from a modulated channel component RF signal broadcast from a single source.

2. A spread spectrum RF receiver according to claim 1, wherein the tracking means comprises vector processor means for linearly interpolating a fixed offset code correlation signal from said plural correlation signals.

3. A spread spectrum receiver according to claim 2, wherein the vector processor means further comprises means for multiplying a said correlation signal times a selected complex constant so as to remove a carrier Doppler component.

4. An RF receiver according to claim 1, wherein the tracking means further comprises
   means for monitoring the correlation signals at discrete times so as to determine a code chip which is approximately synchronized with the code of a received signal, and
   means for linearly interpolating a correlation signal for a code offset by a fixed interval from the code of the received signal.

5. An RF receiver according to claim 1, wherein the tracking means further comprises
   means for comparing said plurality of correlation signals so as to determine an estimate of code offset, and
   means for selecting one correlation signal of said plurality having a greatest code correlation with the received signal.

6. An RF receiver according to claim 1, wherein said baseband converter means converts said linear composite RF signal to baseband by mixing with a local oscillator signal synthesized from a crystal oscillator signal, wherein the receiver further comprises
   means for developing a reference signal representative of crystal temperature, and digital means responsive to the reference signal for varying the local oscillator in accordance with a stored table of information representative of temperature dependent frequency characteristics of said crystal oscillator so as to correct said local oscillator signal for temperature dependent changes in frequency of said crystal oscillator.

7. An RF receiver according to claim 1, wherein said baseband converter means comprises a crystal frequency source for generating a crystal frequency signal under uncontrolled temperature conditions, means for synthesizing a synthesized local oscillator frequency signal at a selected multiple of the crystal frequency signal, means for developing a reference signal representative of crystal temperature, and digital means responsive to said reference signal and to a stored indication of variation of crystal frequency as a function of temperature, for producing a correction frequency equal to the selected multiple times a stored variation, said correction frequency being applied to the synthesized local oscillator frequency to produce a digitally-corrected temperature independent local oscillator frequency, and wherein the digitally-corrected local oscillator frequency is provided to said baseband converter means for downconversion of said RF signal.

* * * * *

UNITED STATES PATENT AND TRADEMARK OFFICE
CERTIFICATE OF CORRECTION

PATENT NO. : 4,894,842

DATED : January 16, 1990

INVENTOR(S) : Van Broekhoven et al.

It is certified that error appears in the above-identified patent and that said Letters Patent is hereby corrected as shown below:

On the title page the patent, at the second line of the caption under "United States Patent", and before "Broekhoven et al." please insert --Van--;

in the designation of Inventors at [75], after "Paul" please delete "V." and insert --Van--.

Column 2, line 6, please delete "OBJECT" and insert --OBJECTS--.

Column 7, line 21, please delete "perating" and insert --operating--.

Column 7, line 30, please delete "Clocks" and insert --clocks--.

UNITED STATES PATENT AND TRADEMARK OFFICE
CERTIFICATE OF CORRECTION

PATENT NO. : 4,894,842

DATED : January 16, 1990

INVENTOR(S) : Van Broehoven et al

It is certified that error appears in the above-identified patent and that said Letters Patent is hereby corrected as shown below:

Column 10, line 16, before "N-bit" please insert --C.--.

Signed and Sealed this

Eighth Day of December, 1992

Attest:

DOUGLAS B. COMER

Attesting Officer

Acting Commissioner of Patents and Trademarks